United States Patent [19]

Priepke et al.

[11] 4,223,846
[45] Sep. 23, 1980

[54] FORAGE HARVESTER

[75] Inventors: Edward H. Priepke, Stevens; Robert A. Wagstaff, New Holland, both of Pa.

[73] Assignee: Sperry Corporation, New Holland, Pa.

[21] Appl. No.: 26,499

[22] Filed: Apr. 3, 1979

[51] Int. Cl.³ .............................................. B02C 18/22
[52] U.S. Cl. .................................. 241/60; 241/101.7; 241/222
[58] Field of Search ................ 406/101; 241/221, 222, 241/57, 58, 60, 101.7, 221, 222, 86.1, 89.3

[56] References Cited

U.S. PATENT DOCUMENTS 4,033,518  7/1977  Fleming et al. ................. 241/222 X Primary Examiner—Mark Rosenbaum Attorney, Agent, or Firm—Frank A. Seemar; Larry W. Miller; James R. Bell

[57] ABSTRACT

A self-propelled forage harvester having a longitudinally extending mobile frame supported by forward and rearward pairs of transversely spaced wheels. A cutterhead unit is mounted on the forward portion of the frame and includes a housing having a rear crop outlet. Within the housing a shear bar is mounted adjacent the path of the knives of a transverse cylindrical cutterhead rotatably mounted in cooperative relationship with the shear bar for cutting crop material fed thereto. Mounted on the frame rearwardly of the cutterhead unit is a blower unit with a housing having a crop inlet aligned with the crop outlet of the cutterhead unit. The blower includes blades rotating within the housing in a generally circular path about an axis inclined forwardly and upwardly to permit the lower limit of the circular path of the blades to be disposed forward of the upper limits of the path.

21 Claims, 3 Drawing Figures

FORAGE HARVESTER

BACKGROUND OF THE INVENTION

The present invention relates generally to crop harvesting machines and more particularly to a new and improved forage harvester machine.

The well known agricultural practice of forage harvesting consists of cutting either green or mature crop material into discrete particles and conveying them from the field to a storage silo where they undergo an acid fermentation to give them an agreeable flavor and to prevent spoilage. This operation, which is commonly referred to as an ensilage process, converts standing crop in the field to livestock feed, commonly referred to as silage. An essential piece of farm machinery used for producing silage is the forage harvester which is adapted to gather crop material from the field, cut it into small particles and then convey the cut crop material to a temporary storage bin or wagon. Harvesters of this type are either self-propelled or pulled by a tractor. Typically, forage harvesters have a rotary cutter of a generally cylindrical configuration with knives peripherally mounted to cooperate with a fixed shear bar for cutting material as it is passed across the surface of the bar. An optical perforated recutter screen is used under some conditions to reduce the size of the cut crop even further when desirable.

Many forage harvesters are provided with a blower to convey the cut crop to a wagon towed behind or along side the harvester for receiving the crop. In some prior art arrangements, cut crop material is transferred to the blower from the cutterhead by intermediate conveyor means such as an auger system. Single or side-by-side augers are used at right angles or parallel to the axis of the rotary cutter. Problems have been encountered in some instances with this type of mechanism when material accumulates unevenly along the augers and causes clogging. From a design standpoint, augers provide extra moving parts that are subject to wear and thereby reduce overall reliability and serviceability characteristics of the harvester. Furthermore, use of augers increases the power requirements of the harvester especially in crop material having high moisture content.

To overcome problems of this nature some prior art forage harvesters have been designated with cutterhead discharging material directly to the blower without intermediate conveying means. In these direct discharge machines the blower fan rotates about an axis horizontal to the ground. The blower unit receives material fed from the cutterhead directly to the fan blades which in turn convey the cut crop material upwardly through a spout and thence to a bin or wagon. To properly accommodate direct feed type upright blowers the blower spout, the operator's platform or other important components are undesirably offset from the path of travel in prior art self-propelled harvesters. This offset has been necessitated to provide proper clearance for the spout with respect to the many other bulky components of the harvester such as the engine, an operator's platform positioned to permit proper visibility, power transmission mechanisms, a fuel tank of a sufficient size to permit long periods of field operation, etc.

SUMMARY OF THE INVENTION

Accordingly, it is a principal object of the present invention to provide a forage harvester having its operative components uniquely arranged in a simple, efficient and economical manner.

A more particular object, taking into consideration the presence of propulsion mechanisms and other required operating components on a self-propelled forage harvester, is to provide an improved combination of components which cooperatively operate in a manner not heretofore known.

In pursuance of these and other objects, the present invention contemplates new and improved forage harvester apparatus in which the blower unit is uniquely positioned in relation to other components to improve the overall efficiency and effectiveness of the harvester while permitting various other related advantages conducive to significant advances in the practice of forage harvesting.

In one embodiment the forage harvester comprises a longitudinally extending mobile frame supported by at least a pair of transversely spaced wheels. A cutterhead unit is mounted on the forward portion of the frame and includes a housing having an outlet for discharging cut crop rearwardly. Disposed within the cutterhead unit is a transverse shear bar in cooperative relationship with a generally cylindrical cutterhead for cutting crop material fed by a feeder mechanism mounted on the forward portion of the frame. Mounted rearwardly of the cutterhead is a blower unit including a housing having a crop inlet in communication with the outlet in the cutterhead unit. A fan is mounted in the blower housing having two or more blades rotatable about a generally longitudinal axis for blowing crop material upwardly and away from the forage harvester machine. The present invention particularly contemplates a blower mounted with its axis inclined upwardly and forwardly whereby the fan blades have paths of rotation extending below the cylindrical cutterhead to minimize the distance between the forwardly mounted shear bar and the fan to enhance the overall performance of the forage harvester. In those instances where a recutter screen is included among the components of the forage harvester the blower position of the present invention is especially advantageous as will become apparent from the following description.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

In the following description, right-hand and left-hand references are determined by facing the direction of travel of the forage harvester machine.

Figure 1:
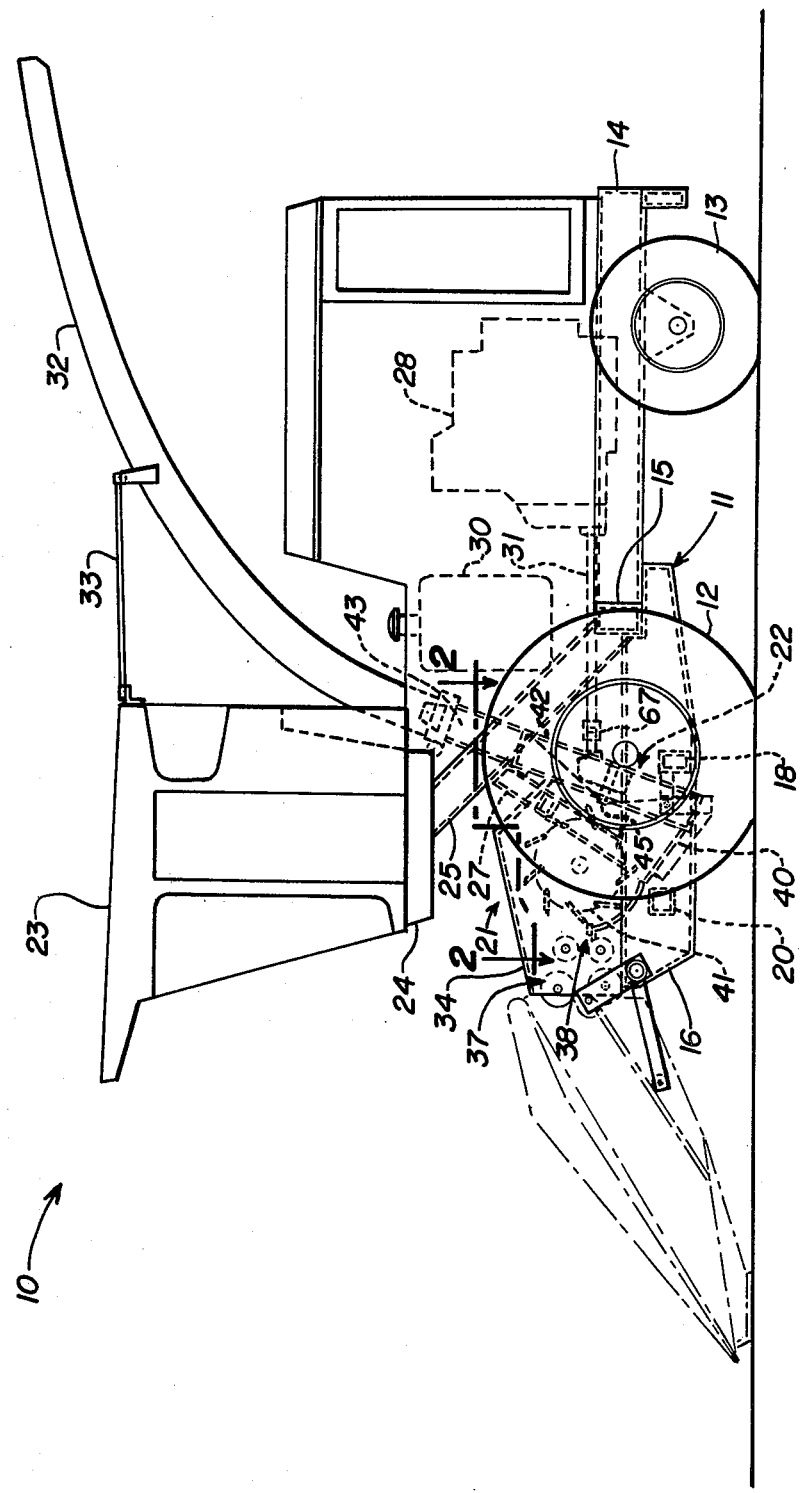
FIG. 1 is a side elevational view of a self-propelled forage harvester showing a machine in which the present invention is embodied.

Referring to the drawings for a detailed description, a self-propelled forage harvester, generally designated by reference numeral 10, is shown in FIG. 1 to illustrate by way of example one type of equipment in which the present invention is embodied. The forage harvester 10 comprises a plurality of operative components mounted on a generally longitudinally extending frame 11 supported at its forward end by a pair of transversely spaced wheels 12 (only one shown, FIG. 1) and supported rearwardly by a pair of transversely spaced wheels 13 (only one shown, FIG. 1).

The frame comprises several integral members including opposing rear members 14 having forward ends terminating in a cross member 15. A pair of opposing forward members 16, 17 extend from cross member 15 with intermediate cross strut 18 and forward cross strut 20 completing the basic longitudinally extending frame. Mounted on the forward portion of the frame is a cutterhead unit 21 and just rearwardly thereof is a blower unit 22, both of which are directly below an operator control unit 23 in the form of an enclosed cab extending upwardly from a supporting platform 24. Operator control unit 23 is supported in a cantilever fashion by a pair of opposing support members 25,26 affixed to and extending upwardly and forwardly from frame cross member 15. Intermediate support members 27 are interposed between opposing forward members 16, 17 and cab support members 25,26.

Completely the general arrangement of typical components in forage harvesters of the self-propelled type is power unit 28 and associated fuel tank 30 (both shown in phantom) mounted within the general enclosure configuration rearwardly of the operator control unit 23. The power unit is drivingly coupled to the cutterhead unit and the blower unit and propels the harvester via means commonly known in the art including but not limited to transmission means, clutching means, drive reversing means, etc. Power and drive components are only schematically shown and are not meant to accurately depict a complete operative system. For example, a shaft 31 is simply shown as extending forwardly from power unit 28 to drive blower unit 22, whereas in practice it is common to utilize a reversing mechanism for the cutterhead and blower drives which would necessarily modify this direct connection.

Also shown in FIG. 1 is a rearwardly and upwardly extending spout 32 for conveying material away from the harvester, a spout support arm 33 extending from the roof of control unit 23, and cutterhead components mounted within side walls 35,36 (see FIG. 2) of a housing 34, including feeder mechanism 37, a shear bar assembly 38, a transfer chute 40 and a cutterhead 41.

More specifically, blower unit 22 includes a housing 42, transition 43 and spout 32. Within the housing a fan 44 is rotatably mounted for rotation about a shaft 45 which is inclined upwardly and forwardly. The inclined position of the blower unit is the very essence of this invention. Among other things, it provides improved operational relationship of the components of the harvester while enhancing the physical relationship. For example, spout 32 is disposed to clear platform 24 of the operator control unit 23 while permitting the lower end of the path of travel of the fan to extend below and forward of the rearmost portion of the path of travel of the cutterhead. This important relationship will be described in detail hereinbelow.

Figure 2:
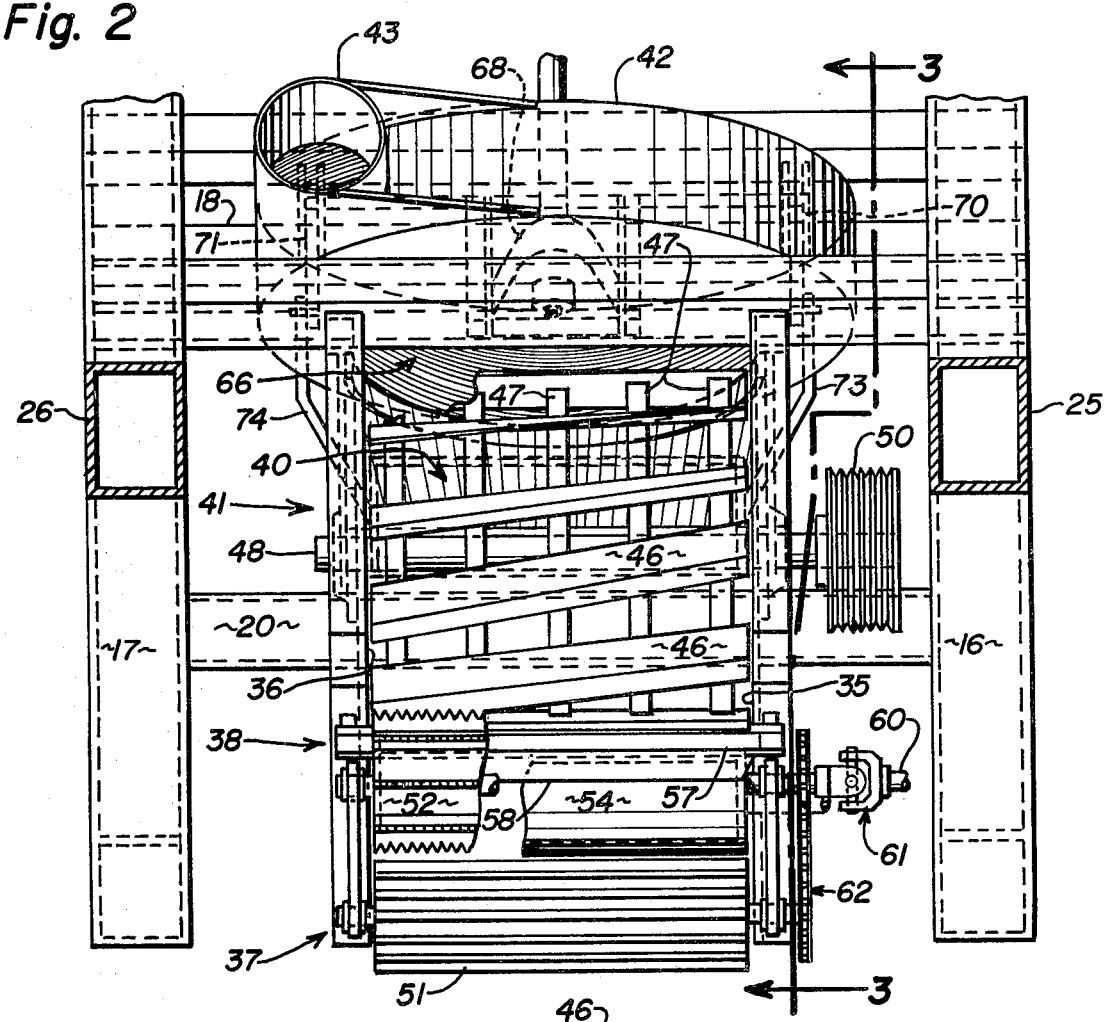
FIG. 2 is a partial plan view of the forage harvester shown in FIG. 1 taken along lines 2—2 of FIG. 1.
Figure 3:
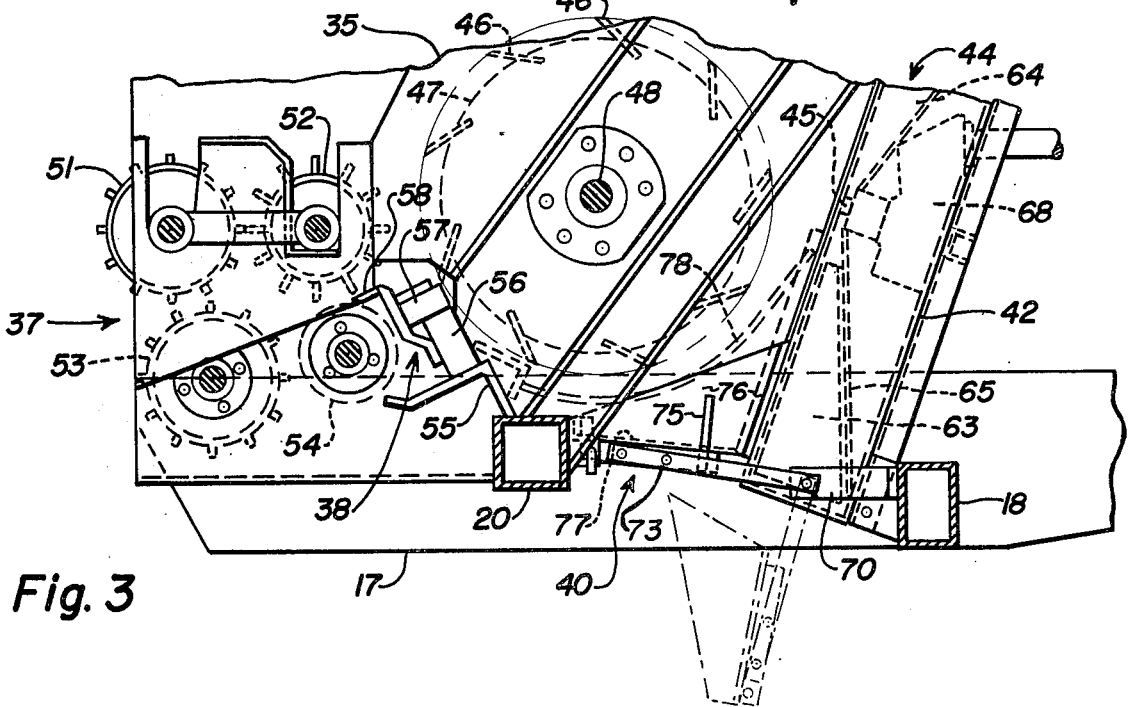
FIG. 3 is a fragmentary side elevational view taken along lines 3—3 of FIG. 2.

Now turning to FIGS. 2 and 3 where the components of cutterhead unit 21 are shown in detail, a cutterhead 41 of a conventional nature is depicted comprising a plurality of knives 46 mounted laterally on a series of side-by-side plate members 47. Cutterhead 41 rotates via shaft 48 journalled in side walls 35,36 of housing 34. Drive for the cutterhead is provided by a belt (not shown) in cooperative engagement with sheave 50 (FIG. 2) keyed to shaft 48. The drive for the cutterhead as mentioned above is provided by power unit 28, a detailed description of which is not essential for the purposes of the present invention.

The feeder mechanism 37 comprises upper feed rolls 51,52 and lower feed rolls 53,54, all of which are mounted for rotation about transverse axes in a standard manner between side wall members 35,36. Completing the cutterhead unit is shear bar assembly 38 consisting of a transverse bracket 55 (FIG. 3) affixed to forward cross strut 20. Secured to bracket 55 is a support block 56 on which is mounted shear bar 57 which is accessible through an opening in the side wall members permitting adjustment for precise positioning with respect to the cutting edges of knives 46. Adjustment of the shear bar is accomplished in a well known manner the details of which are not an essential part of this description. Attached to the shear bar assembly is a scraper member 58 mounted forward of the shear bar in cooperative relationship with the smooth surface of lower feed roll 54. Drive for the feed roll assembly is provided by input shaft 60 (FIG. 2) coupled to the power unit in a conventional manner (not shown). Motion is imparted to the feed rolls via a universal joint 61 and chain and sprocket assembly 62.

Mounted on frame 11 rearwardly of cutterhead 41 is blower unit 22, referred to above. Blower housing 42, secured to intermediate cross strut 18, includes a generally cylindrical chamber in which fan 44 is journalled for rotation via shaft 45. Fan blades 63 and 64, attached to fan base plate 65, are adapted to receive crop material through an access opening 66 and convey it upwardly and through transition member 43 interposed between blower housing 42 and spout 32. The lower portion of blower housing 42 is below and foward of the path of travel of the cutterhead knives 46, the outline of which is shown in FIG. 3. Drive for fan 44 is provided via shaft 31 which transmits rotational force to shaft 45 via a universal 67 (FIG. 1) coupled to a gear box 68, shown in phantom.

Chute 40 is provided to guide crop from the cutterhead to access opening 66 in blower housing 42. This chute, pivotally attached to brackets 70,71 via support arms 73,74 includes a transverse support rib 75, side portions 76 and a base 77 formed to guide material downwardly and rearwardly to the opening in the blower housing. Chute 40 is releasably pivotable to an access position (shown in phantom in FIG. 3) for cleaning and service purposes. In its operative position chute 40 completes the enclosure formed by the cutterhead housing and the blower housing thus controlling communication between the cutterhead and blower units.

In operation, harvested crop material is guided to feeder mechanism 37 via a header such as a row crop unit or a windrow pickup unit, both of which are common in the art. A unit of the row crop type is shown in phantom in FIG. 1 for exemplary purposes. Crop material guided between opposing upper and lower feed rolls 51,52 and 53,54, respectively, is fed to shear bar assembly 38. Shear bar 56 is mounted to cooperate with knives 46 on cutterhead 41 to cut crop material in small particles and propel it downwardly and rearwardly within the enclosed cutterhead unit via chute 40 and thence into access opening 66 of blower unit 22. Cut material is thereupon engaged by fan base plate 65 and blades 63,64 which in turn propel it along a generally circular path and tangentially out through transition member 43, then to spout 32 and rearwardly to a trailing wagon which is not shown. In other arrangements the spout directs material to a wagon alongside the harvester or to a bin mounted on the harvester.

In some conditions, a recutter screen 78 is used in a conventional manner as an integral part of cutterhead unit 21. The screen 78, shown in phantom in FIG. 3, has perforations in varying sizes, the edges of which recut crop material as it is passed through the screen from the cutterhead to the blower. The velocity of material is diminished due to the interposed recutter screen. The recutter is only used under certain conditions, such as where corn kernels require cracking, or the particle lengths of the cut crop material is critical, etc.

The unique apparatus and particularly the position and relationship of the blower unit in the forage harvester discussed above provides many advantages. For example, the lower limit of the path of travel of the fan blades is forward of the upper limits of the path and the lower portion of the opening is under and forward of the periphery of the cutterhead, thus enhancing the effectiveness of the blower in that cut crop material is received more directly from the shear bar unit and thereby improving overall performance without affecting efficiency. Also, the unique positional relationship of the blower opening and fan with respect to the cutterhead unit improves material flow via a recutter screen (when used) which has a natural tendency to impede material passage, i.e., material flow is assisted by gravity and the shorter path enhances average crop particle velocity.

Furthermore, the unique combination discussed above provides advantages in that cab placement in the center and over the cutterhead in a more rearward position improves visibility of the forage harvester operator. The blower unit is inclined from a position below operator control unit 23 to a position to the rear of the cab, whereby the spout clears the lower rear portion of platform 24 of the operator control unit via a slight cutaway portion behind the control area. This reduces the exit angle of transition member 43 with respect to the frame and thereby permits a more gradual curvature in the spout to give more efficient delivery of material than heretofore experienced.

A still further and important advantage of the structure of the forage harvester apparatus described above is the ability to position the cab or operator control unit over the front axle. This provides important weight distribution characteristics which are critical in the design of self-propelled farm machinery which must be designed to operate in adverse field transport conditions. Also, with respect to weight distribution characteristics of the machine described is the ability to position the blower unit directly under the cab and thus likewise dispose weight over the front axle.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A self-propelled forage harvester comprising in combination:
   (a) a longitudinally extending mobile frame having a forward end portion supported by a pair of transversely spaced wheels,
   (b) a cutterhead unit mounted on the forward portion of said frame and including a housing having a rear crop outlet opening, a shear bar mounted within said housing, a transverse generally cylindrical cutterhead, means rotatably mounting said cutterhead adjacent said shear bar in cooperative relationship for cutting crop material, and feed means for feeding crop material to said cutterhead,
   (c) a blower unit mounted on said frame rearwardly of said cutterhead unit and including a blower unit housing having a crop inlet opening adjacent said rear crop outlet of said cutterhead unit, a fan having blades rotatably mounted within said blower unit housing for rotation in a generally circular path, having upper and lower limits, about an axis for blowing cut crop material upwardwardly and rearwardly away from said forage harvester, said axis being inclined forwardly and upwardly whereby the lower limit of said path is forward of the upper limit, and
   (d) a power unit mounted on said frame comprising an engine with output means for driving said cutterhead unit and said blower unit whereby crop material cut by said cutterhead is conveyed to said blower unit via said inlet opening and thence upwardly and rearwardly via said blower unit;
   (e) an operator control unit including a platform mounted on the forward end of said frame over said transversely spaced wheels,
   (f) said cutterhead unit mounted between said transversely spaced wheels,
   (g) said blower unit including a spout extending upwardly and rearwardly from said blower housing, said spout operatively associated with said fan to receive cut material conveyed by said blades, and
   (h) said blower unit mounted below said operator control unit.

2. A forage harvester comprising in combination:
   (a) a mobile frame having a forward end portion supported by a pair of transversely spaced wheels,
   (b) a cutterhead unit mounted on the frame and including a cutterhead housng having a rear crop outlet opening, a shear bar mounted forwardly within said cutterhead housing, a generally cylindrical cutterhead rotatably mounted adjacent and in cooperative relationship with said shear bar for cutting crop material, and feeder means for feeding crop material to said cutterhead,
   (c) a blower unit mounted on the frame rearwardly of the cutterhead unit and including a blower unit housing having a crop inlet opening adjacent said rear crop outlet of said cutterhead unit, a fan rotatably mounted within said blower unit housing for blowing cut crop material upwardly and rearwardly away from the forage harvester, the axis of rotation of said fan being inclined forwardly and upwardly to minimize the distance between said forwardly mounted shear bar and said fan, and a spout extending upwardly and rearwardly from said blower unit housing, said spout operatively associated with said fan to receive crop material conveyed thereby, and (d) power transmission means on said frame comprising means for driving said cutterhead unit and said blower unit whereby material cut by said cutterhead unit is conveyed to said blower via said inlet and thence upwardly and rearwardly via said spout.

3. A forage harvester as set forth in claim 2 wherein said fan further comprises a plurality of blades rotating in a generally circular path having an upper limit and a lower limit, and lower limit being below said cylindrical cutterhead.

4. In a self-propelled forage harvester having:
(a) a longitudinally extending mobile frame having a forward portion supported in its forward end by a pair of transversely spaced wheels,
(b) a cutterhead unit mounted on the forward portion of said frame and including a cutterhead housing having a rear crop outlet opening, a transverse forwardly mounted shear bar within said cutter head housing, a transverse generally cylindrical cutterhead, means rotatably mounting said cutterhead adjacent and in cooperative relation with said shear bar for cutting crop material, and a feeder mechanism for feeding crop material to said cutterhead,
(c) a blower unit mounted on said frame rearwardly of said cutterhead unit and including a blower unit housing, a crop inlet opening in said blower unit housing adjacent said rear crop outlet of said cutterhead unit to receive crop material from said cutterhead unit, and a fan rotatably mounted within said blower unit housing for rotation about an axis for blowing crop material upwardly and rearwardly away from said forage harvester,
(d) a power unit mounted on said frame comprising an engine without output means for driving said cutterhead unit and said blower unit whereby material cut by said cutterhead unit is conveyed to said blower unit via said inlet opening and thence upwardly and rearwardly via said blower unit, the improvement comprising,
(e) said blower unit being mounted with said axis inclined upwardly and forwardly,
(f) said fan comprising two or more blades having paths of rotation extending below said cylindrical cutterhead unit to minimize the distance between said forwardly mounted shear bar and said fan,
(g) said blower unit including a spout extending upwardly and rearwardly from said blower unit housing, and
(h) said spout operatively associated with said fan to receive crop material conveyed by said blades.

5. In a self-propelled forage harvester as set forth in claim 4 wherein said improvement further comprises a floor inclined rearwardly and extending between said crop inlet opening in said blower and said crop outlet opening in said cutterhead unit housing.

6. In a self-propelled forage harvester as set forth in claim 5 wherein said self-propelled forage harvester includes a screen between said cutterhead unit and said blower unit for recutting crop material as it passes therethrough prior to engagement by said blades, and said improved blower receives crop material after being passed through said screen.

7. In a self-propelled forage harvester as set forth in claim 4 wherein said shear bar is mounted forward of said cutterhead and said cutterhead is mounted between said wheels and wherein said paths of said fan blades have lower limits which extend below and forward of the rearmost portion of said cylindrical cutterhead.

8. In a self-propelled forage harvester as set forth in claim 4 wherein said self-propelled forage harvester further comprises an operator control unit including a platform mounted on the forward end of said frame over said wheels, and wherein said improved blower unit is below said platform.

9. In a forage harvester having:
(a) a mobile frame having a forward end portion supported by a pair of transversely spaced wheels,
(b) a cutterhead unit mounted adjacent the forward end portion of the frame and including a cutterhead unit housing having a rear crop outlet opening, a transverse forwardly mounted shear bar within said housing, a transverse generally cylindrical cutterhead, means rotatably mounting said cutterhead adjacent and in cooperative relationship with said shear bar for cutting crop material, and a feeder mechanism for feeding crop material to said cutter head,
(c) a blower unit mounted on the frame rearwardly of the cutterhead unit and including a blower unit housing, a crop inlet opening in said blower unit housing adjacent said rear crop outlet of said cutterhead unit to receive crop material from said cutterhead unit, and a fan rotatably mounted within said housing for blowing crop material upwardly and rearwardly away from the forage harvester,
(d) power transmission means on said frame comprising means for driving said cutterhead unit and said blower unit whereby material cut by said cutterhead is conveyed to said blower unit via said inlet opening and thence upwardly and rearwardly via said blower unit, the improvement comprising,
(e) said blower fan being mounted with its axis inclined upwardly and forwardly,
(f) said fan comprising two or more blades, having paths of rotation extending below said cylindrical cutterhead to minimize the distance between said forwardly mounted shear bar and said fan,
(g) said blower unit including a spout extending upwardly and rearwardly from said blower unit housing, and
(h) said spout operatively associated with said fan to receive crop material conveyed by said blades.

10. In a forage harvester as set forth in claim 9, wherein said improvement further comprises a floor inclined rearwardly and extending between said crop inlet opening in said blower and said crop outlet opening in said cutterhead unit housing.

11. In a forage harvester as set forth in claim 10 wherein said forage harvester includes a screen between said cutterhead unit and said blower unit for recutting crop material as it passes therethrough prior to engagement by said blades, and said improved blower receives crop material after being passed through said screen.

12. In a forage harvester as set forth in claim 9, wherein said shear bar is mounted forward of said cutterhead and said cutterhead is mounted between said wheels and wherein said paths of said fan blades have lower limits which extend below and forward of the rearmost portion of said cylindrical cutterhead.

13. In a forage harvester:

(a) a ground supported mobile frame having a front to rear longitudinal axis and a vertical axis
(b) crop cutting means and means for propelling said cut crop mounted on said frame
(c) said cut crop propelling means including means for directing said crop rearwardly on said longitudinal axis
(d) blower means mounted on said frame rearwardly of said cutting and propelling means for receiving said cut and propelled crop
(e) said blower means including a propeller having its plane of rotation inclined from the vertical axis and transverse to said longitudinal axis
(f) said blower having a bottom crop receiving means and a top generally vertical crop discharging means and having said propeller when operating moving said cut crop from said bottom crop receiving means upwardly to said top generally vertical crop discharging means
(g) said mobile frame having ground engaging wheels including a pair of front wheels positioned on axes transverse to said longitudinal axis
(h) said blower means being positioned in front of said wheel axes, and
(i) said blower means extending upwardly over said wheel axes.

14. In a forage harvester as in claim 13 and wherein:
(a) said blower means extends downwardly below said wheel axes.

15. In a forage harvester as in claim 14 and including:
(a) power means on said frame positioned rearwardly of said blower means.

16. In a forage harvester as in claim 13 and including:
(a) operator control means mounted on said frame and spaced above and over said blower means.

17. In a forage harvester as in claim 16 and wherein:
(a) said operator control means is cantilevered from said mobile frame.

18. In a forage harvester as in claim 16 and wherein:
(a) said cantilevered operator control means extend over and above said crop cutting means and said crop propelling means.

19. In a forage harvester as in claim 13 and including:
(a) crop guide means between said cut crop propelling means and said blower means.

20. In a forage harvester as in claim 19 and wherein:
(a) said crop guide means includes a downwardly pivoted chute.

21. In a forage harvester as in claim 13 and including:
(a) screen means associated with said cut crop propelling means.

* * * * *